Figure 3:
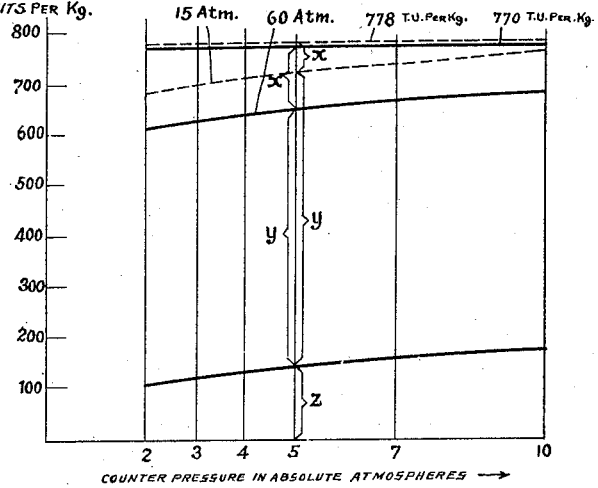

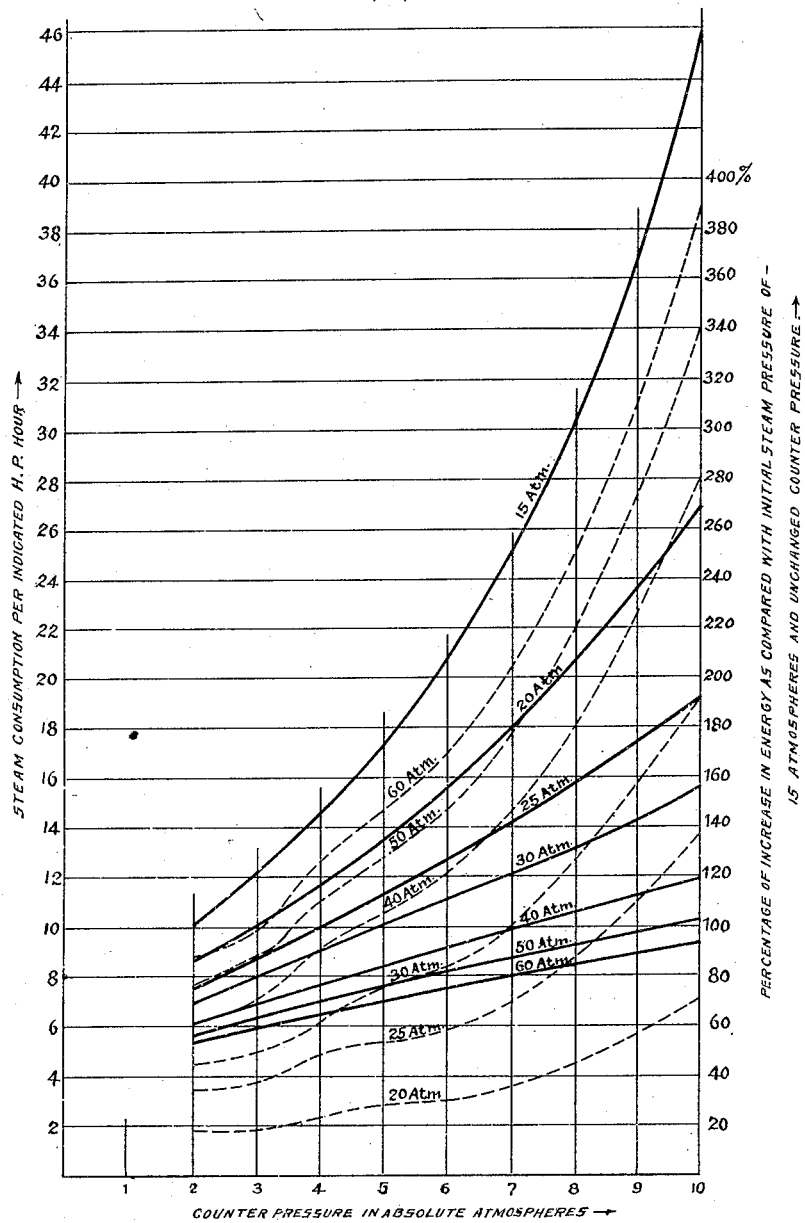

Dec. 31, 1929.  W. SCHMIDT ET AL  1,741,378
PROCESS AND APPARATUS FOR OBTAINING POWER AND HEAT FROM STEAM
Filed July 9, 1921  3 Sheets-Sheet 2

INVENTORS
WILHELM SCHMIDT
OTTO HARTMANN
BY
ATTORNEYS

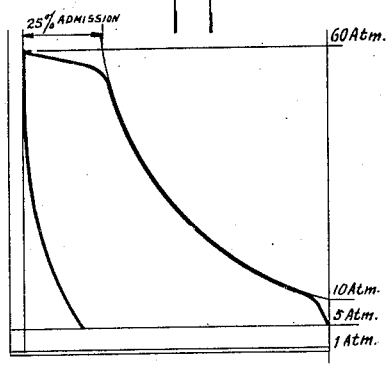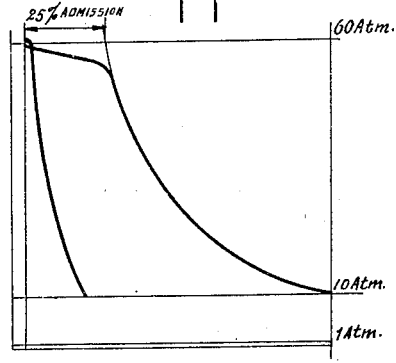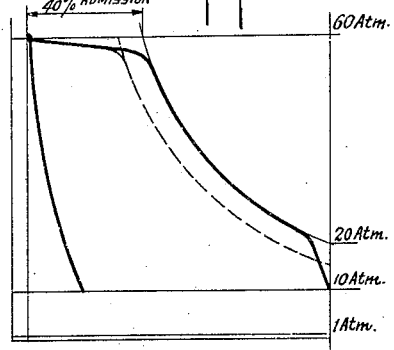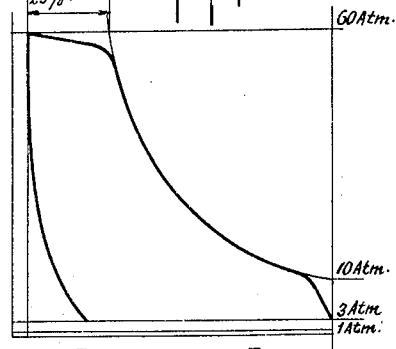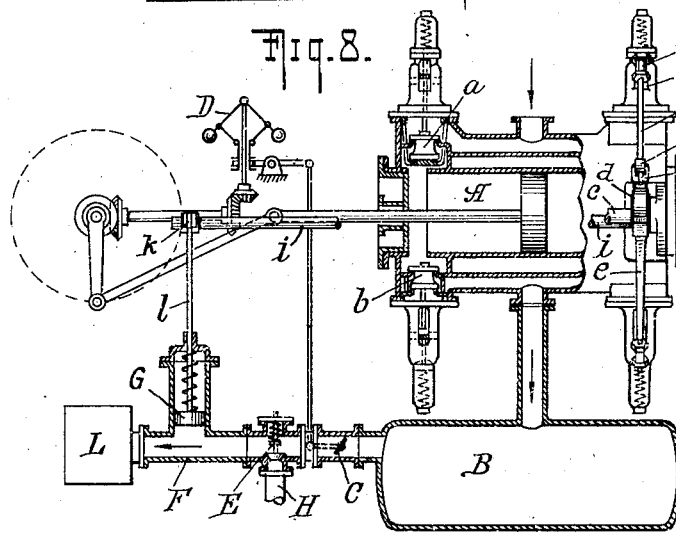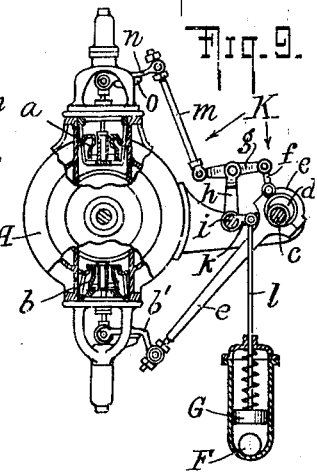

Patented Dec. 31, 1929

1,741,378

UNITED STATES PATENT OFFICE

WILHELM SCHMIDT AND OTTO HARTMANN, OF CASSEL-WILHELMSHÖHE, GERMANY, ASSIGNORS TO SCHMIDT'SCHE HEISSDAMPF-GESELLSCHAFT, M. B. H., A CORPORATION OF GERMANY

PROCESS AND APPARATUS FOR OBTAINING POWER AND HEAT FROM STEAM

Application filed July 9, 1921, Serial No. 483,567, and in Germany January 26, 1920.

The present invention relates to a process and apparatus for utilizing the energy and the heat contained in high pressure steam. Advantages of great importance, as set forth in the description following hereinafter, are secured, according to this invention, by using steam having an initial pressure of at least thirty atmospheres absolute, for driving a counterpressure engine, the steam after having performed work in said engine, being employed for heating, including drying, or like operations in which the heat remaining in such steam is utilized. We may define a counter-pressure steam engine as one from which the exhaust passes out at a pressure above atmospheric pressure.

By thus employing high-pressure steam according to our invention, it becomes possible to operate with high counter-pressures of any desired value, even as high as the initial live steam pressures hitherto used, and notwithstanding these high counter-pressures, very favorable figures are obtained, as regards consumption of steam and heat, per unit of power. Thus it will not be possible in many instances where hitherto the desired power could be obtained from a given weight of steam only by means of a condensing engine operating at the usual comparatively low pressures, to develop the same amount of power from the same weight of steam of a high-pressure counter-pressure engine operating according to the present invention, and have a substantial amount of heat units available for heating purposes. This invention therefore offers a novel way of obtaining both power and heat from steam.

We are aware of the fact that it has proposed to use for power purposes, steam having high pressures of the order mentioned above. Such proposals, however, related exclusively to steam engines exhausting either directly into the atmosphere, or into a condenser pressure below atmospheric). The utilization of the heat is at best very imperfect in such cases, since the heat of the exhaust is usually lost in the atmosphere or in the cooling water of the condenser respectively.

We are also aware of the fact that the exhaust steam of counter-pressure engines has been utilized for heating and like purposes. In practice, however, such engines could be employed in this manner only in comparatively few cases, since the requirements of power and exhaust steam could seldom be brought into harmony, and its was assumed erroneously that even with low power development there was a perfect utilization of the steam.

While isolated proposals have been made looking toward a moderate increase of the initial pressure and of the counter-pressure in counter-pressure steam engines, these did not extend to the use of pressures of the special novel degree or order contemplated in our present invention, and were distinguished from the prior art merely in matters of degree.

The invention has the following main novel advantages or characteristics:

First, with the initial pressures employed hitherto in the operation of counter-pressure steam engines, any increase in counter-pressure calls for a very material increase in steam consumption per unit of power, such consumption increasing at a greater rate than the counter-pressure. When, however, according to our invention, the initial steam pressure amounts to 30 atmospheres or more, the steam consumption per unit of power increases but slightly with an increase in counter-pressure, and does not increase any faster than the counter-pressure, but only at about the same rate, or even when using very high initial pressures) at a lower rate.

Second, the amount of power which may be obtained from a given weight of steam is but slighty affected when using even high counter-pressures, in case the initial steam pressure is of the high order contemplated by our invention.

These advantages will apply alike whether the steam employed be saturated steam or superheated steam.

Figure 2:
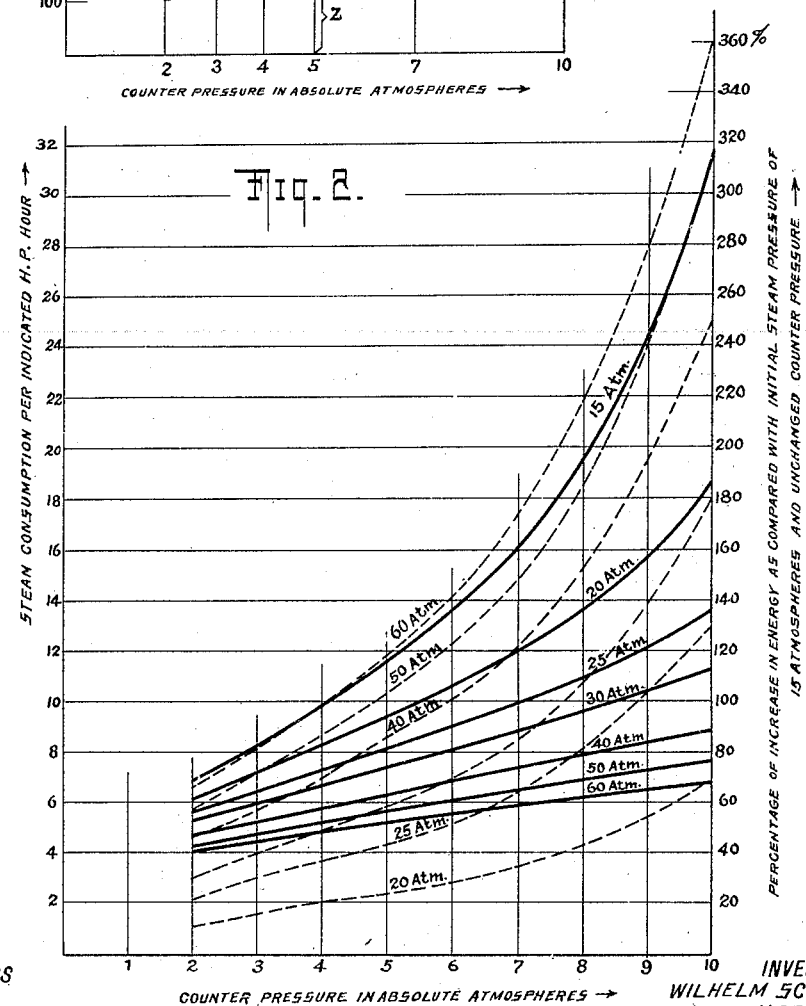

Reference is to be had to the accompanying drawings in which Figures 1, 2 and 3 are diagrams explanatory of the improved conditions obtainable with our invention, Figs. 1 and 2 illustrating the amount of steam consumption and the increased energy obtainable according to our invention under different conditions of initial steam pressure and of counter-pressure; Fig. 1 illustrates these conditions as regards saturated steam and Figs. 2 as regards superheated steam of four hundred degrees centigrade. Fig. 3 is a diagram illustrating two specific cases of our invention as hereinafter referred to. Figs. 4–7 inclusive are diagrams illustrating various modes of regulating an engine operating according to our invention, such modes of regulation also forming part of our present invention, Fig. 4 represents conditions with a live steam pressure of sixty atmospheres and a counter-pressure of five atmospheres absolute, assuming a single-stage high-pressure piston engine; Fig. 5 illustrates the changed conditions established when, in view of reduced power requirements, but with an unaltered amount of exhaust steam, the counter-pressure is increased to ten atmospheres; Fig. 6 illustrates the changed conditions established when, in view of an increased requirements of steam for heating purposes, but with the same power requirement as in Fig. 4, the counter-pressure is raised to 10 atmospheres, as in Fig. 5, and the rate of steam admission is increased from 25% to 40%; Fig. 7 illustrates the changed conditions established when, in view of increased power requirements, but with the same amount of steam for heating purposes as in Fig. 4, the counter-pressure is reduced to three atmospheres. Fig. 8 illustrates in diagrammatic form a single cylinder piston engine adapted for operation according to our present invention, and Fig. 9 is a diagrammatic end view of the arrangement shown in Fig. 8.

In Figs. 1 and 2 the curves drawn in solid lines indicate the steam consumption at initial steam pressures of fifteen, twenty, twenty-five, thirty, forty, fifty and sixty atmospheres under varying conditions of counter-pressure. The ordinates indicate steam consumption in kilograms per indicated horse-power hour while the abscissæ indicate the counter-pressure in absolute atmospheres. It will be seen by reference to the curves corresponding to fifteen, twenty and twenty-five atmospheres, beginning with a counter-pressure of two atmospheres absolute which is the minimum required in practice for heating purposes, that the steam consumption increases at a higher rate than the counter-pressure; in other words, the curves corresponding to fifteen, twenty and twenty-five atmospheres have a distinct upward concavity. At a certain limit steam pressure which lies at about thirty atmospheres, the curve becomes a straight line forming an acute angle with the abscissæ axis. At this limit pressure, therefore, the consumption of steam will increase at the same rate as the counter-pressure. At steam pressures above said limit pressure, the steam consumption will increase at a smaller rate than counter-pressures, or, in other words, the curves corresponding to said higher pressures will have a concavity facing downwards or toward the abscissæ axis. These statements apply to that portion of the curves which corresponds to the range of counter-pressures occurring in practice, that is to say, counter-pressures from two atmospheres up to about ten to thirteen atmospheres and more absolute. The dotted curves in Figs. 1 and 2 indicate the increased power developed according to our invention with initial steam pressures of twenty, twenty-five, thirty, forty, fifty and sixty atmospheres, the abscissæ indicating the counter-pressure as before while the ordinates, as indicated by the scale at the right, represent the increased power in percentages of the power which is developed by an engine using an initial pressure of fifteen atmospheres. Referring, for example, to Fig. 2 and to a case in which the counter-pressure is four atmospheres absolute and the initial steam pressure fifteen atmospheres (the temperature, therefore, being 142.8° C.), the steam consumption will be found to be 9.75 kilograms per indicated horse-power hour. If now the initial steam pressure is raised to thirty atmospheres, all other conditions remaining equal, it will be seen from Fig. 2 that the steam consumption is reduced to 6.58 kilograms per indicated horse-power hour, that is to say, by 32.5% of the steam consumption at fifteen atmospheres. This shows that with the same weight of steam, an energy increased by 48% will be obtained. If the live steam pressure is increased to sixty atmospheres, the other conditions remaining as before, the steam consumption per indicated horse-power hour will drop to 4.9 kilograms. In this case, therefore, there will be a saving in steam consumption amounting to 4.85 kilograms per indicated horse-power hour, that is to say, about 50%, and in other words, the increase in energy amounts to about 100%.

Should the counter-pressure be seven atmospheres absolute, a case which occurs frequently in practice, the steam consumption per indicated horse-power hour will be 16.1 kilograms at an initial pressure of fifteen atmospheres and a corresponding steam temperature of 400°; all other conditions remaining equal, the steam consumption will drop to 8.78 kilograms if the initial pressure is increased to thirty atmospheres and will be reduced to 5.95 kilograms if the initial pressure rises to sixty atmospheres. The increase in power developed will, therefore, be 83.4% in one case and 171% in the other. For the sake of economy, any stem required for heating purposes should be the exhaust of a steam engine plant operating according to our invention, even in those cases where the plant is not able to utilize itself, the full power developed by the engine operating according to our invention. With modern power transmission conditions, it will be always possible to dispose of any excess power since this excess power could not be produced more cheaply in any other way, not even by utilizing water power.

The opinion prevailing at the present time, that there is no economic advantage in using steam of twenty atmospheres or more is based exclusively on a consideration of the conditions obtaining with condensing engines and all efforts made hereto to operate with high pressure steam had exclusive reference to such condensing engines. The following consideration will explain this readily. When using a high vacuum, for instance, 96%, the power developed by the steam between four absolute atmospheres and the condenser pressure is greater than the power developed between sixty atmospheres and four atmospheres. With reference to the total drop of temperature, a gain of only about 12% is therefore obtained with a condensing engine of this character by increasing the initial steam pressure from fifteen to sixty atmospheres, particularly when taking into consideration the reduction of the total thermic efficiency.

Our invention not only presents the advantage explained above with respect to the power developed by the engine, but also improves the utilization of the waste heat. It is well known that for industrial purposes the heat is usefully effective only when it is available at a relatively high temperature. This applies also to the utilization of waste heat and therefore the work or efficiency of a heating, vaporizing or drying plant operated by heat is the more effective and is the greater the higher the temperature of the heating medium. In many cases in which, heretofore, the heat of steam was utilized directly for heating purposes and in which a high degree of efficiency was obtained, this was rendered possible only by a corresponding sacrifice in the indirect utilization of heat, that is to say, in power production, so that the engine, as it were, functioned chiefly as a throttling device.

In other cases, steam has been taken hitherto from an intermediate stage in order to obtain an economic operation and still employ heating steam of a high temperature. This mode of operation, however, is available only when not more than fifty to sixty per cent of the steam supplied to the engine is required for heating purposes since the stage of the engine following the point at which the intermediate steam is taken, must receive sufficient working steam, even at low loads, to prevent dry running of the working piston. In this case, therefore, a portion of the exhaust steam will be lost or wasted in the cooling water of the condenser just as is the case when employing an operation exclusively with the condenser. When steam is taken from an intermediate stage, the engine becomes of rather complicated construction. In such cases, even with an initial pressure of ten atmospheres, there will be required at least two working stages with complicated regulating arrangements for the adjustment of the distributing valves and a condenser plant, as well as the complications arising through the necessity of providing large amounts of cooling water or a return-cooler arrangement.

If the total power developed is compared with the steam consumption of a two-stage piston engine having an intermediate tapping of steam, assuming an initial steam pressure of fifteen atmospheres and corresponding to a live steam temperature of 400° C., the amount of intermediate steam tapped as 50%, its pressure, five atmospheres absolute, and a condenser pressure of from .08 to .1 atmospheres. It has been found that under these conditions, in the best case, the steam consumption will be about six kilograms per indicated horse-power hour. A similar or even more favorable result is obtained when employing a high pressure piston engine with utilization of waste heat and a counter-pressure of likewise five atmospheres, but a live steam pressure of from forty to fifty atmospheres. In this latter case, the entire amount of exhaust steam can be utilized for heating purposes. Even if it should be impossible to utilize all this steam for heating purposes, it would still be possible to condense this unutilized portion of the exhaust under full counter-pressure and at a relatively high temperature with very much less cooling water than required hereto and to recover the heat contained in the condensation product of the exhaust at a temperature corresponding to the counter-pressure at least for heating the feed water of the boiler. A very valuable recovery of heat is thus effected. The excess exhaust steam may also be utilized for the production of additional feed water free from boiler scale. Bearing in mind those advantages, a counter-pressure engine operating according to our new process is more economical than an engine operating at the pressures customary hitherto and with a tapping of steam between two stages of the engines.

In as much as our new process enables the initial steam pressure or live steam pressure and the counter-pressure of the engine to be chosen as desired, our invention affords the means of either increasing the efficiency of an existing plant for the utilization of heat or of providing a new plant of greater simplicity and lower cost than hitherto. If, for instance, a heating, drying or evaporating process was to be carried out by heating in a case where the live boiler pressure of from fifteen to twenty atmospheres is available and where a certain power development and a certain amount of heat is required, it was frequently necessary hitherto, in order to obtain the power demanded, to operate with a low counter-pressure, for instance, two atmospheres absolute. This circumstance reduced the heating effect since the temperature of 120° which corresponds to the pressure of two atmospheres had to be used even when the substance under treatment could have been heated advantageously to a higher temperature. The necessity for using a comparatively low temperature involved the use of needlessly large heating surfaces in the heating apparatus, a relatively long duration of the process and generally, also, the use of a vacuum in the heat utilization plant. According to our invention, the heating pressure may be increased, for instance, to five atmospheres whereby the heating temperature is brought to 151° and in this case even without the use of a vacuum which, when used hitherto, required a condensing plant, we are enabled to employ vaporizing or drying apparatus comprising several units and to increae the efficiency of the heat utilization plant. In a case of this character, a live steam pressure of from thiry-five to forty atmopheres is sufficient to obtain the same amount of energy from the same weight of seam. By employing a steam pressure of, for instance, sixty atmospheres, an excess of power will be developed and this excess can be delivered at any point in a suitable manner, for instance, in the form of electrical energy. Other important advantages result from the fact that it is not necessary, with our invention, to adhere strictly to certain limits in the counter-pressure employed in connection with the engine. For instance, a portion of the exhaust steam may be used directly in a heat utilization plant and the remainder of the exhaust steam may be stored in a heat accumulator in order to have it available as such times as the boiler plant or the engine is not in operation. By increasing the counter-pressure, for instance, from three to four atmospheres absolute to ten atmospheres, it now becomes possible to effect the storage in the heat accumulator at a relatively high pressure without losing anything in the power developed and this would be absolutely impossible with an engine operating at the customary live steam pressure even when using a high degree of admission. Owing to this increased pressure it therefore becomes possible to use a heat accumulator of considerably smaller volume. The new process is aplicable in all technical and industrial plants which require steam for heating purposes, for instance, chemical works, sugar factories, paper mills, dye works, finishing works, briquette factories, peat-drying works, etc. As indicated above, it is desirable to operate these plants in conjunction with electric works so that a power plant operating according to our invention may dispose of any excess power to neighboring electric plants or other works requiring only power and no heat.

For the sake of greater clearness, we have shown in Fig. 3 separately, the conditions obtaining, particularly in the case of a counter-pressure of five absolute atmospheres, the initial steam pressure being from fifteen to sixty atmospheres and the initial steam temperature 400° C. This diagram illustrates the utilization of heat for power and for heating purposes; the dotted lines refer to conditions at fifteen atmospheres initial steam pressure, while the two solid lines at the upper part of the figure relate to an initial steam pressure of sixty atmospheres. The abscissæ indicate counter-pressure in absolute atmospheres and the ordinates indicate thermal units per kilogram. The amount of heat $x$ indicated by the vertical distance between the two upper lines is a measure of the amount of heat converted into indicated power; the amount indicated $y$ represents the exhaust heat available for heating purposes while $z$ indicates the amount of heat contained in the condensation water of the exhaust steam. By comparing the value of any steam at ordinary pressure, say of fifteen atmospheres, and high pressure steam, for instance, of sixty atmospheres, the great superiority of our mode of operation over the present procedure will be readily understood. Thus, the diagram shows that with a counter-pressure of five atmospheres only fifty-five thermal units per one kilogram of steam will be converted into power when the initial steam pressure if fifteen atmospheres, but if the pressure is increased to sixty atmospheres, the amount of heat converted into power will rise to one hundred and twenty thermal units per kilogram, that is to say, in the latter case, the amount of heat utilized for power purposes will be 2.18 times as large as in the former case.

While in the former case, the amount of exhaust heat utilizable for heating purposes (represented by $y$) is equal to $778-55-151$ or 572 thermal units, this amount of exhaust steam available for heating will be only $770-120-151$ or 499 thermal units per kilogram in the second case, that is to say, smaller by 12.8%. Therefore, if the same amount of exhaust heat is to be available with sixty atmospheres initial steam pressure as with fifteen atmospheres, the amount of live steam must be increased 15%. Referred to the same amount of exhaust heat, the indicated power of the engine will thus be increased more than two and one half times; therefore, even with a relatively low counter-pressure of five atmospheres absolute, the power developed when utilizing waste heat according to our invention will rise to an entirely unexpected figure.

The present invention, however, does not relate exclusively to the provision of means for the maximum utilization of steam, but, as will be shown below, the invention also includes ways and means for harmonizing the power developed and the amount of heating steam required.

It is well known that the present practice of regulating steam engines consists either in varying the admission or in keeping the admission constant and reducing the live steam pressure by throttling. If, in a steam engine plant of this character, at any particular time, the utilized power of the machine is smaller than corresponds to the required amount of exhaust steam, a special pressure-reducing device must be provided for supplying a supplementary amount of steam taken from the boiler to the exhaust steam-utilizing plant. Should this device fail, particularly in the case of a high live steam pressure, there arises the danger of the full boiler pressure reaching the plant in which the exhaust steam is utilized and causing an explosion.

In view of this, we shall now proceed to describe a new regulating process which avoids the difficulties just mentioned and also presents other unexpected advantages. This regulating process consists in reducing the power-developing capacity of the steam by increasing the counter-pressure of the engine and in increasing the steam consumption per unit of power to such a point that the amount of exhaust steam required will be obtained. With this arrangement, it is impossible for boiler steam to pass directly to the heat-utilizing plant, since the steam is compelled, in all cases, to pass first through the engine. Furthermore, this affords the possibility of varying, within wide limits, the heating pressure and therefore the temperature of the heating steam, which is of particular importance when the substance treated in the heat-utilizing plant is to be exposed to different temperatures. The increased counter-pressure which occurs temporarily when employing the new regulating process may also be appropriately utilized since the boiler feed water may be heated in a feed water heater by the final exhaust steam of relatively high pressure to a temperature corresponding to the increased counter-pressure. Contrary to what takes place when operating according to our invention, a change in admission or a throttling of the live steam when proceeding according to the regulation employed hitherto takes place which has the disadvantage of cooling the cylinder walls of the engine. When, thereupon, the power is again increased to its original value, these cylinder walls are again heated to a higher temperature and this causes losses by condensation on the dead surfaces of the working cylinders. When, however, the power is regulated according to our invention, the rate of admission may remain unaltered with the same live steam pressure. The mean temperature of the dead surfaces, which depends on the temperature of the live steam and of the exhaust will, with the same live steam temperature, be higher, notwithstanding the decreased power, than with the particular power development for which the engine is intended; therefore, sudden changes in the load may occur without causing any increase in the losses by condensation or heat exchange at the cylinder walls. This advantage will be of value, particularly in the case of plants operating with wet steam and subject to considerable changes of load, for instance, in cellulose works in which wood is first treated mechanically and subsequently boiled in the heat-utilizing plant.

The arrangements adopted for varying the counter-pressure may be of varied construction. Since these arrangements are for the purpose of regulating the power, it is necessary, in cases of engines requiring to be operated by the constant number of revolutions, to put these arrangements under the influence of a velocity governor and to actuate them directly or indirectly by said governor.

We shall now describe a satisfactory arrangement for the new regulating device controlling the counter-pressure. The exhaust valves of the working cylinder control the passage of the exhaust steam to a relatively large tank or receiver.

The outlet from this receiver is controlled by a throttle valve, the position of which is controlled by a velocity-governor according to the power to be developed. The purpose of the receiver is to equalize the periodically-occurring steam-hammer blows in such a way that the fluctuations of counter-pressure on the supply side of the throttle valve will be but slight. The supply of steam to the engine is controlled by the heating pressure in any well known approved manner; for instance, the admission (or in other words, the timing of the cut-off) is varied according to the fluctuations of the heating pressure in any suitable manner, as directly by a pressure operated regulator. Should, at any time, more heating steam be required than the engine is able to supply at the particular rate of admission, the supply of steam to the engine will be increased, for instance, by the operation of the pressure operated regulator, governing the rate of admission.

The various conditions which may occur in practice have been illustrated in Figs. 4–7 by indicator diagrams. Let us assume, for example, that ordinarily the engine is to operate with a live steam pressure of sixty atmospheres and a counter-pressure of five atmospheres absolute. Fig. 4 shows a diagram available for these conditions when using a single-stage high-pressure piston engine.

1. If the development of power is to be reduced while leaving the amount of exhaust steam unaltered, a velocity regulator will increase the counter-pressure until the particular reduced power development desired is obtained. In this case, the rate of admission remains unchanged. The diagram, Fig. 5, shows the changes in pressure conditions occurring in this case, it having been assumed that the counter-pressure has been increased from five atmospheres to ten atmospheres.

2. If the power development is to remain unchanged but a greater amount of heating steam is desired, the rate of admission is increased by a pressure regulator and at the same time, the counter-pressure is increased by a velocity regulator. This regulation is illustrated in Fig. 6 by the dotted admission and expansion line.

3. If the power developed and the amount of heating steam is to be increased at the same time, this can be accomplished either by an exclusive increase of the rate of admission in cases where the amount of exhaust steam required increases in the same ratio as the power requirement, or both the rate of admission and the counter-pressure must be increased when the amount of exhaust steam required is greater than the one corresponding to the power developed. This mode of regulation is illustrated by the solid lines in Fig. 6.

4. If the amount of heating steam required remains unchanged and the power development is to be increased, but only within certain limits, it being permissible in this case to employ a lower temperature of the heating medium, regulation may be obtained by reducing the counter-pressure, for instance, from five atmospheres to three atmospheres, as illustrated by the diagram, Fig. 7.

Figs. 8 and 9 illustrates, diagrammatically, a one-stage piston engine and devices for regulating its operation according to our present invention. A is the steam cylinder having inlet valves $a$ and exhaust valves $b$. B is the receiver for the exhaust from said cylinder. C is a throttle valve D is a centrifugal governor which controls the position of the throttle valve C. At E we have indicated a reducing valve contained in the exhaust steam conduit F, this valve having for its office to maintain the pressure in the heat-utilizing plant (indicating diagrammatically at L, Fig. 8) automatically at the desired point and to admit live steam from a conduit H whenever the heating pressure is too low. The inlet valves $a$ are controlled by a regulator G which is operated by the heating pressure.

Should there be an increase in the consumption of the heating steam (exhaust steam) which passes from the conduit F to the heat-utilizing plant, the pressure in said conduit will fall correspondingly, and the piston of the regulator G will be shifted downwardly by the spring which acts in opposition to the pressure in said conduit. Through the medium of suitable link mechanism K, this motion of the piston of the regulator G is caused to increase the admission of team by keeping the inlet valves $a$ open for a greater length of time than when such piston was in its original position. If, on the contrary, the consumption of heating steam taken from the conduit F should decrease, the pressure in said conduit will rise, the piston will move up (compressing the spring above such piston), and the valves $a$ will be set to cut down the admission of steam. It will be understood that the throttle valve C, controlled by the centrifugal governor D operated by the engine, will ensure to such engine, a power output in accordance with requirements.

The link mechanism K, actuating the engine valves $a$, $b$, and particularly the inlet valves $a$, may be given any construction that will cause the inlet valves to open always at a fixed point in the stroke but to close earlier or later so as to shorten or lengthen the time during which the inlet valves remain open. As an example of a link mechanism suitable for the purpose of our invention we may refer to the well-known Widnmann valve-gear, full details of which have been published in Dubbel's book "Die Steuerungen der Dampfmaschinen," Berlin 1905, pages 140–143, and also in Leist's book "Die Steuerung der Dampfmaschinen," Berlin 1900, pages 596, 597 and 598. In Figs. 8 and 9 we have illustrated the application of such Widnmann valve-gear to the power and heating plant described above. This valve-gear of Figs. 8 and 9 comprises a shaft $c$ driven in any suitable manner (not shown) from the main shaft of the engine. On this shaft are secured rigidly two eccentrics $d$, one in the plane of the pair of valves $a$, $b$ shown at the left in Fig. 8 and the other in the plane of the right-hand pair of valves $a$, $b$. Each eccentric $d$ cooperates with its individual eccentric strap $e$ actuating the small outlet valves $b$ through an intermediate lever $b'$. On the shaft $i$ which is parallel to the shaft $c$ is mounted rigidly a lever $k$ connected pivotally with a rod $l$ secured to the regulator piston G. On the shaft $i$ are also secured rigidly crank arms $h$ each in the plane of one of the pairs of valves $a$, $b$. Each arm $h$ carries a fulcrum for a lever $g$ connected at one end with the respective eccentric strap $e$ by a link $f$. At the other end of the lever $g$ is pivotally connected with a rod $m$ which has a similar connection with a rocker $n$ having a rocking engagement with a stationary support $o$ and arranged to actuate the inlet valve $a$. If by the action of the regulator G, the shaft $i$ is rocked in one direction or the other, the crank arms $h$ will also be rocked and the position of the fulcrum point of each lever $g$ will be shifted. The parts, however, are so proportioned in accordance with the Widnmann construction that such shifting of said fulcrum points will not vary the time of opening of the inlet valve $a$ relatively to the stroke, but will vary the length of time during which such valves will remain open.

We claim:

1. The improvement in the art of utilizing steam which consists in introducing steam at an initial pressure of at least 30 atmospheres into an engine while exhausting steam from such engine at varying pressures above atmospheric into a heat utilizing apparatus, thereby establishing such a condition for utilizing the steam, first for producing power and then for giving up heat, that successive equal increases in exhaust pressure will not require successive progressively larger increases in steam consumption.

2. The improvement in the art of utilizing steam in accordance with claim 1 in which the increased or decreased pressure in the conduit leading from the engine into the heat utilizing apparatus temporarily resulting from decreasing or increasing the consumption of heating steam is utilized to increase or decrease the supply of steam to the engine, the resulting increase or decrease of the engine speed being balanced by a greater or less throttling of the exhaust steam to thereby vary the back pressure of the engine.

3. In combination a steam engine, a governing device driven by such engine, a heat utilizing apparatus, a conduit connecting the exhaust port of the engine with said apparatus, a throttle in said conduit, an operative connection from said governing device to said throttle so arranged that an increase or decrease of the engine speed will cause the governing device, through such connection, to move the throttle away from or toward its fully open position, respectively, and a pressure operated regulator exposed to and operated by the pressure beyond said throttle, for governing the supply of steam to the engine.

In testimony whereof we have hereunto set our hands.

WILHELM SCHMIDT.
OTTO HARTMANN.